United States Patent
Ray et al.

(10) Patent No.: US 9,817,874 B2
(45) Date of Patent: Nov. 14, 2017

(54) PARALLEL SPATIO TEMPORAL INDEXING FOR HIGH-UPDATE WORKLOADS AND QUERY PROCESSING

(71) Applicants: Suprio Ray, Walldorf (DE); Rolando Blanco, Walldorf (DE); Anil Kumar Goel, Walldorf (DE)

(72) Inventors: Suprio Ray, Walldorf (DE); Rolando Blanco, Walldorf (DE); Anil Kumar Goel, Walldorf (DE)

(73) Assignee: SAP SE, Walldorf (DE)

( * ) Notice: Subject to any disclaimer, the term of this patent is extended or adjusted under 35 U.S.C. 154(b) by 639 days.

(21) Appl. No.: 14/031,702

(22) Filed: Sep. 19, 2013

(65) Prior Publication Data

US 2015/0081719 A1    Mar. 19, 2015

(51) Int. Cl.
G06F 17/30    (2006.01)

(52) U.S. Cl.
CPC .. G06F 17/30551 (2013.01); G06F 17/30241 (2013.01)

(58) Field of Classification Search
CPC .............. G06F 17/30551; G06F 17/30241
USPC ....................................................... 707/743
See application file for complete search history.

(56) References Cited

U.S. PATENT DOCUMENTS

| | | | | |
|---|---|---|---|---|
| 2007/0113031 A1* | 5/2007 | Brown | ................ | G06F 12/023 711/160 |
| 2009/0163228 A1* | 6/2009 | Blumberg | .............. | G01C 21/20 455/456.3 |
| 2009/0216787 A1* | 8/2009 | Wang | ................ | G06F 17/30241 |
| 2010/0079336 A1* | 4/2010 | Skibiski | ................ | G06Q 30/02 342/357.31 |
| 2012/0054302 A1* | 3/2012 | Priyadarshan | ......... | G06Q 30/02 709/217 |
| 2012/0239291 A1* | 9/2012 | Do | ........................ | G01S 5/0236 701/451 |
| 2013/0225201 A1* | 8/2013 | Chen | ........................ | G01S 5/02 455/456.2 |
| 2014/0156327 A1* | 6/2014 | Cai | .................... | G06Q 10/1053 705/7.14 |

OTHER PUBLICATIONS

Suprio Ray, et al., "PASTIS: A parrallel in-memory spatio-temporal index to support high-update workloads and answer historical, present and predictive queries in a column-store database," ACM SIGSPATIAL GIS '13, Nov. 5-8, 2012, 10 pages.

* cited by examiner

Primary Examiner — Alexey Shmatov
(74) Attorney, Agent, or Firm — Sterne, Kessler, Goldstein & Fox P.L.L.C.

(57) ABSTRACT

Disclosed herein are system, method, and computer program product embodiments for providing a spatio-temporal index for high-update workloads and query processing. An embodiment operates by a first thread retrieving an update record from a first queue, the update record comprising a location component and a temporal component indicating a location of one of a plurality of mobile devices at a specified time, and updating a columnar-store database with the update record. The embodiment further operates by a second thread identifying a spatial grid of a spatial temporal index within a memory corresponding to the location component of the update record, and updating a temporal index of the spatial grid based on the temporal component of the update record.

20 Claims, 5 Drawing Sheets

PARALLEL SPATIO TEMPORAL INDEXING FOR HIGH-UPDATE WORKLOADS AND QUERY PROCESSING

BACKGROUND

Location-based services (LBSs) typically receive location data from a number of mobile devices, perform some type of processing on the data, and provide a service to the mobile devices or other entities. However, with the increase in popularity of LBSs has come a corresponding increase in the number of service requests and the amount of data a LBS may receive at any given time, as well as an increase from the number of mobile devices from which the data is received. Conventional LBSs have difficulty handling that large amounts of data and processing that may be required to provide services for a large number of mobile devices.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for providing a spatio-temporal index for high-update workloads and query processing.

Figure 1:
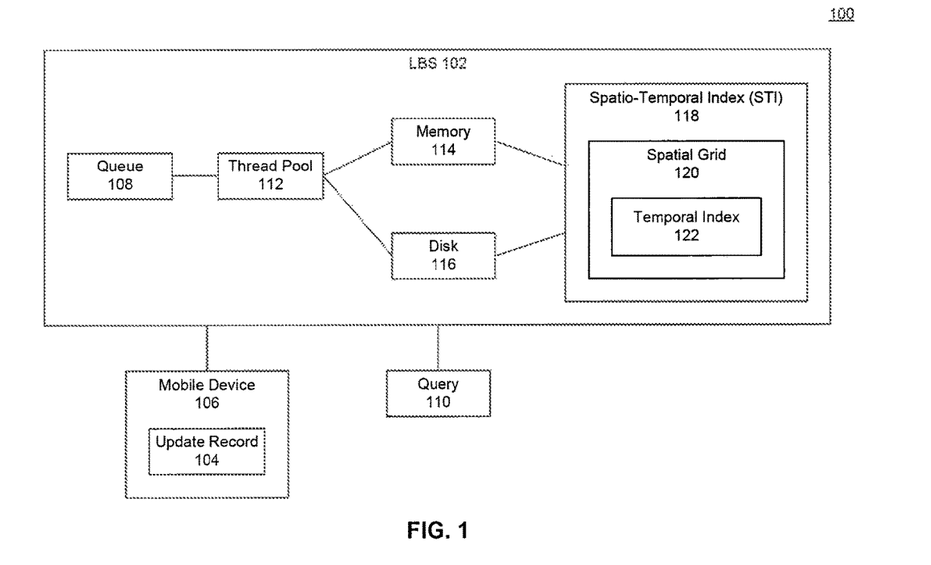
FIG. 1 is a block diagram of a system that includes a spatio-temporal index for high-update workloads and query processing, according to an example embodiment.

FIG. 1 is a block diagram 100 of a system that includes a spatio-temporal index for high-update workloads and query processing, according to an example embodiment. A location-based service (LBS) 102, for example, is a system that receives high-update workloads and performs query processing. Though the exemplary embodiments described herein relate to LBS 102, one skilled in the art would recognize that the teachings herein may be applied to other types of services or systems as well.

LBS 102 may receive updates from moving vehicles or other objects (e.g., cellular devices, GPS systems, etc.) about their location, direction, speed, and other location-based status information about the objects. LBS 102 may store and process this location-based information, respond to queries, or provide other forms of data analysis.

LBS 102 may receive update records 104 from mobile devices 106. Mobile device 106 may be any global positioning, GPS, or other location-determining unit. Mobile device 106 may be mounted on a car or other vehicle (including aircraft or watercraft), carried by an individual, implemented within a mobile telecommunications device, or may be a standalone device. Mobile device 106 may periodically transmit location, movement, and other status information via update record 104.

Update record 104 may be data transmitted by mobile device 106 that indicates a time stamped position, location, direction, and/or velocity of mobile device 106. Update record 104 may be received by LBS 102 directly from mobile device 106 or via a third-party that transmits update record 104 to LBS 102. In an embodiment, update record 104 may be time stamped upon its receipt by the third-party, at the LBS 102 system, or by mobile device 106 itself.

Update record 104 may be received by LBS 102 and placed into a queue 108. Update records 104 that cannot be immediately processed upon receipt by or arrival to LBS 102 may be placed in queue 108. For example, there may not be any processors or threads immediately available upon the arrival of update record 104 at LBS 102. In an embodiment, queue 108 is a first-in, first-out (FIFO) queue. In an embodiment, update record 104 may be placed into queue 108 prior to any processing being performed on update record 104.

LBS 102 may also receive queries 110. Query 110 may be any inquiry about or request for location, movement or other status data (e.g., update records 104) stored and/or processed by LBS 102. Query 110 may include, for example, an inquiry as to how many vehicles (e.g., mobile devices 106) passed through an intersection on a given date within a particular time period. Query 110 may be a historical, present, or predictive query. When received, if there are not any available processors or threads, queries 110 may also be placed in queue 108.

LBS 102 may include multiple queues 108. Different queues 108 may exist for different types of task. For example, a first queue 108 may be for update records 104, while a second queue 108 may be for queries 110. In an embodiment, LBS 102 may include multiple queues 108 to perform the same task. For example, LBS 102 may include multiple queues 108 for updating records 104, and a second set of queues 108 for processing queries 110. Having multiple queues 108 directed towards performing the same tasks may reduce lock conflicts among the threads that are accessing the queues 108.

A thread pool 112 may include threads that read and process update records 104 and/or queries 110 from one or more queues 108. For example, each queue 108 may have a separate thread pool 112 with threads that are designated to process whatever information may be queued. In another embodiment, two or more queues 108 may share the same thread pool 112. A thread may be a process of a processor that executes independently of other processes or threads. For example, an update thread from thread pool 112 may process update records 104 and store that information in memory 114 (or disk 116), or update/add/remove the location-based data that is stored in a spatial temporal index 118. A query thread from thread pool 112 may process past, present, or predictive queries 110. In an embodiment, different types of queries (e.g., past, present, predictive) may be handled or processed by different threads from different thread pools 112.

Location-based data (e.g., including update records 104) may be stored in either a memory 114 or a disk 116. In an embodiment, LBS 102 may include memory 114 that stores recent location-based data, while disk 116 stores older location-based data. For example, there may exist a time threshold (e.g., a specific date/time, or time period) whereby data that is more recent than the threshold is stored in memory 114, and older data beyond the threshold is stored on disk 116. For example, the threshold may be set to 45 days for memory 114 storage, and older than 45 days for disk 116 storage. Then for example, newly received update records 104, including recent location-based data, may be stored by threads of thread pool 112 in memory. Another process may be responsible for transferring older data from memory 114 to disk 116. In an embodiment, disk 116 storage may have a maximum threshold as well. For example, disk 116 or another process may purge data older than 90 days.

Memory 114 storage may be more costly (e.g., consume more resources and/or be more expensive) than disk 116 storage, but have the advantage of allowing faster access to data (e.g., for read/write/update operations). As such, data that is more frequently accessed (e.g., or otherwise anticipated to be more frequently accessed) may be stored in memory 114, while other data, which is less frequently requested, updated, or otherwise accessed may be stored on disk 116. In an embodiment, memory 114 may include a column-store database.

Data (e.g., location-based, movement, and update records 104) may be organized or otherwise stored within a spatial-temporal index (STI) 118. Data stored in STI 118 is organized to allow for the fast storage, processing, and retrieval of data. For example, STI 118 may be organized first based on a location or spatial grid 120, and then by a time element or temporal index 122.

Figure 2:
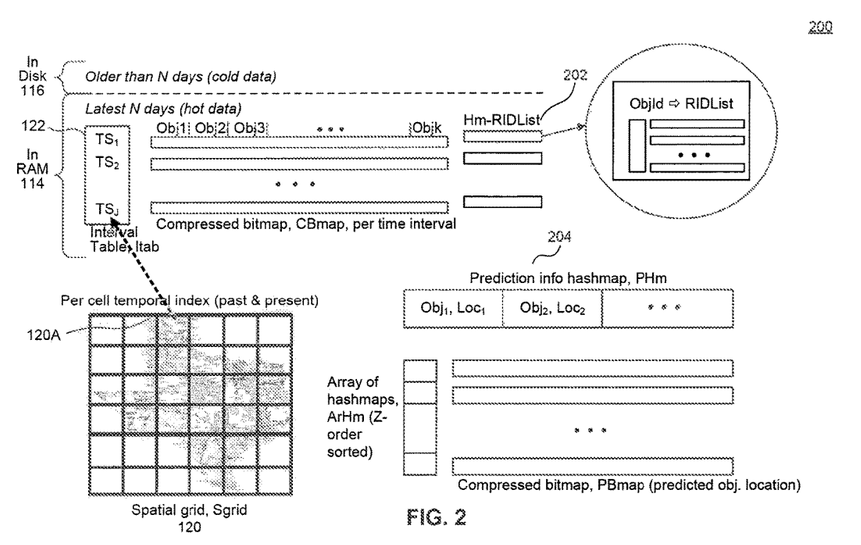
FIG. 2 is a block diagram illustrating the structure of a spatio-temporal index, according to an example embodiment.

FIG. 2 is a block diagram 200 illustrating the structure of a spatio-temporal index 118, according to an example embodiment.

In an embodiment, LBS 102 may, for example, receive data from mobile devices 106 located across the state of Texas. A map or geography of Texas may then be divided into a spatial grids 120, with a number of grid units 120A. Each grid unit 120A may represent a particular location, radius, or other area within the state of Texas, or whatever other geographic area that may be sub-divided. In an embodiment, the border of spatial grid 120 and/or grid units 120A may identified by longitudinal and latitudinal markers or values. In other embodiments, spatial grids 120 and/or grid units 120A may be identified by zip codes, cities, counties, area codes, or other geographic markers/identifiers.

In an embodiment, it may be that particular geographic regions (e.g., such as densely populated cities) may provide significantly more data than others regions (e.g., undeveloped habitats, or less-densely populated towns). In such instances, select geographic regions or grid units 102A may be further sub-divided into smaller grid units 120A, until such a point that they meet a particular grid unit criteria. The grid unit criteria may include any discernible features by which to divide a geographic region into grid units 120A. For example, the population density or anticipated travel patterns of mobile devices 106 may be known and may be used to sub-divide a geographic region into spatial grids 120. Then, for example, LBS 102 may include grid units 120A representing various or differing sizes of geographic areas. In another embodiment, each grid unit 120A may be of identical size. In an embodiment, the grid units 120A may not all be contiguous and/or an LBS 102 may include multiple non-contiguous spatial grids 120.

Each spatial grid 120 may include temporal indexes 122. Temporal index 122 may represent a period of time associated with the geographic region of the spatial grid 120. For example, temporal index 122 may track how many and/or which mobile devices 106 entered or reported their location (e.g., via update record 104) to be within a particular grid unit 120A at a particular date and time or time frame.

Temporal index 122 includes an interval lookup table (Itab) with an entry for each time interval for the past N days. The time intervals for the past N days (hot data) will be stored in memory 114, while older time intervals (i.e., beyond N days) are stored on disk 116 (cold data). The time interval entries, for each temporal index 122, may be stored as a bitmap. The bitmap may be a compressed bitmap that identifies which mobile devices 106 reported their location as being within the corresponding grid unit 120A at or during at least a portion of a given time interval.

In an embodiment, the time intervals of the compressed bitmaps may be of varying granularities. For example, a first time interval measured in minutes, may include data for the past 12 hours, and a second time interval measured in hours, may include data for the past 24 hours. Bitmaps for these intervals may be created by or-ing bitmaps from the more granular intervals as time progresses. Other embodiments may include different interval measurements and data inclusion intervals. For data records older than the data inclusion intervals, a compressed bitmap may be maintained.

For each time interval entry or temporal index 122, there may also be a hashmap 202. Hashmap 202 may associate each moving object (mobile device 106) that reported their location as being within the grid unit 120A at a given time, with a list of record identifiers (RIDs) used to locate in a columnar in-memory store the actual records. The records of the columnar in-memory store may include information such as a date stamp, latitude, longitude, and velocity for the moving object 106 while it was at grid unit 102A during the time interval.

When responding to queries, checking a compressed bitmap of temporal index 122 may be a fast operation to identify whether an object was present during a particular time interval. Checking hashmap 202, however, may be a relatively expensive operation (e.g., consuming more resources and/or time). If a query interval completely overlaps a temporal interval, there may be no need to check hashmap 202 to determine the exact timestamp of a mobile device 106. If however, the query interval only partially overlaps a temporal interval, hashmap 202 may be accessed to determine the precise date or timestamp.

In an embodiment, a prediction hashmap 204 may be maintained. Prediction hashmap 204 may include predicted location data for mobile devices 106. For example, based on update records 104, including, velocity, direction, and location information, LBS 102 may generate predictive information stored within prediction hashmap 204. Prediction hashmap 204 may include an array of hashmaps each associated with a compressed bitmap. The compressed bitmaps may represent the predicted vehicle status within spatial grid 120 at a future configurable time interval. Prediction hashmap 204 may be used to respond to predictive queries 110.

Figure 3:
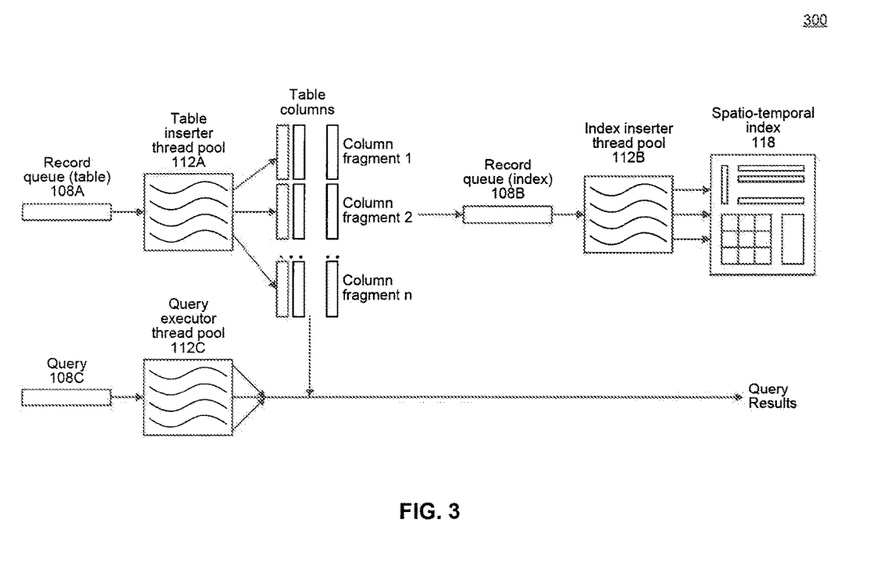
FIG. 3 is a block diagram illustrating how threads from thread pool may interact with data from queues, according to an example embodiment.

FIG. 3 is a block diagram 300 illustrating how threads from thread pool 112 may interact with data from queues 108, according to an example embodiment. Incoming update records 104 may be received in table queue 108A until an available table thread 112A from table inserter thread pool receives update record 104.

When a table thread 112A becomes available, table thread 112A may identify a table within an in-memory column store (e.g., in memory 114) corresponding to update record 104. As noted above, each update record 104 may be associated with a particular mobile device 106. Each mobile device 106 may correspond to or have a particular identifier, such as a vehicle or mobile ID, hereinafter referred to as ID. The ID may be used as a primary key for a table. Table thread 112A may then identify a column fragment including the ID of update record 104. Each table in memory 114 or disk 116, may include or otherwise be divided into a number column fragments. The column fragments may include any portion or segment of a table/column that may be independently accessed or updated.

As noted above, memory 114 may include a column-oriented or column-store database. Each column may represent a field of data which may be provided in update records 104. In an embodiment, the fields of the column-database may be: ID, latitude, longitude, date/time stamp, direction, and speed. In other embodiments, the columns may vary or including different fields.

In an embodiment, LBS 102 may track a large number of mobile devices 106. For example, hundreds of thousands or millions of mobile devices 106 may be tracked. Traditional database systems may require that table data is locked prior to updating the data of a table. However, locking a table that manages millions of records may cause an undesirable or even unacceptable backlog or delay in record processing. As such, the columns of memory 114 may be further divided or fragmented into table or column fragments. Each column fragment may then be independently modified, updating, or otherwise accessed by separate table threads 112A.

After the particular column fragment has been updated by table thread 112A, update record 104 may be placed within index queue 108B. The table thread 112A may then be released, and return to table queue 108A to process the next waiting update record 104.

Index threads 112B from the index inserter thread pool may process the waiting records from 108B. Index threads 112B update spatio-temporal index 118. For example, as discussed with regard to FIG. 2, index thread 112B may first identify the grid unit 120A corresponding to the longitude and latitude of update record 104. Then, within the identified grid unit 120A, index thread 112B may update the temporal index 122 corresponding to the date or timestamp of update record 104.

In an embodiment, grid unit 120A may include an identifying point from within the grid unit 120A. For example, the identifying point may be a center point, lower left corner, or other designated point of grid unit 120A. The identifying point may then be converted into an integer code using a Z-order or Morton order encoding. Grid units 120A may then be stored by their integer code and stored in an array of integers. Index threads 112B may then identify grid unit 120A from the array of integers. Z-order conversion may be a fast computation operation. As such, when a new record is to be processed, its position (longitude and latitude) may be converted into a Z-order code. Then, using a quick search algorithm, the corresponding Z-order grid unit 120A may be identified.

Incoming queries 110 may be received by query queue 108C. Awaiting queries 110 may then be processed by query threads 112C from the query thread pool. Depending on the nature of the query 110, query threads 112C may access data from memory 114 and/or disk 116.

Figure 4:
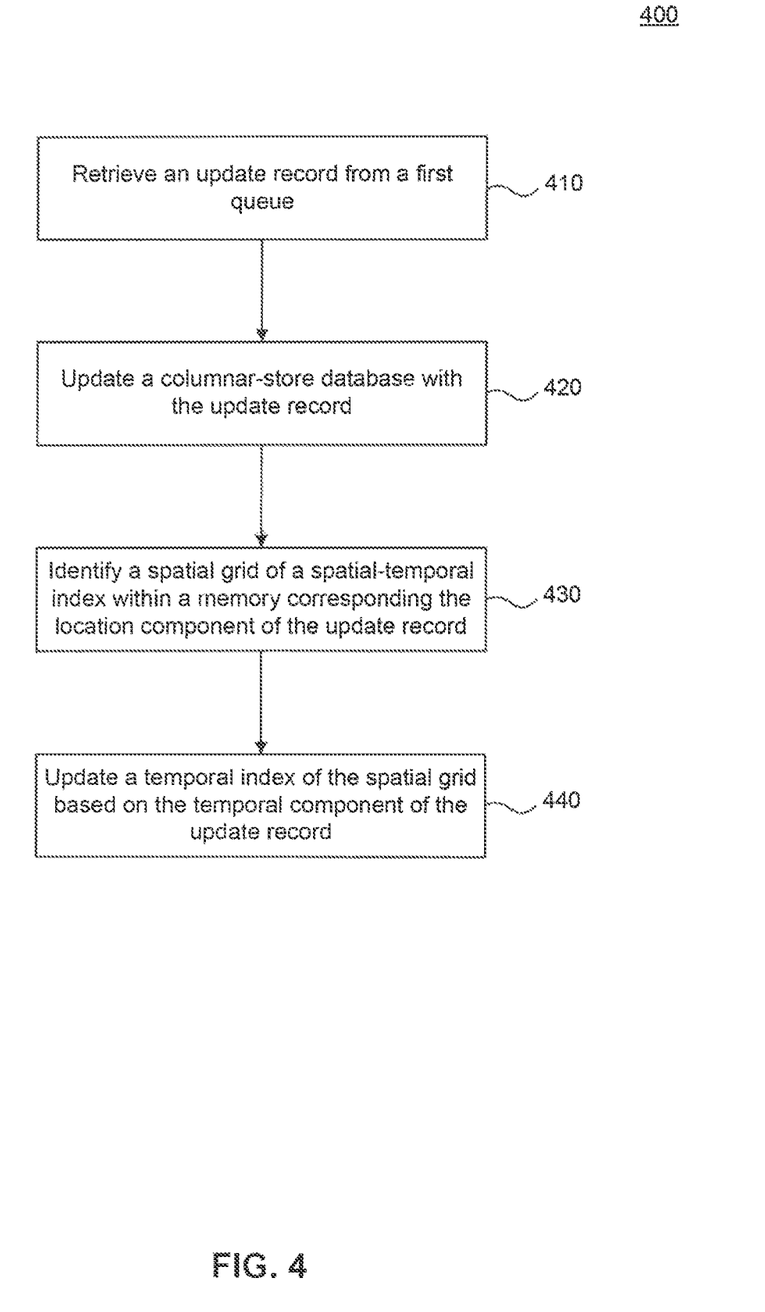
FIG. 4 is a flowchart illustrating a process for providing a spatio-temporal index for high-update workloads and query processing, according to an example embodiment.

FIG. 4 is a flowchart 400 illustrating a process for providing a spatio-temporal index for high-update workloads and query processing, according to an example embodiment. The process of FIG. 4 may be described with reference to objects identified by FIGS. 1-3.

At stage 410, an update record is retrieved from a first queue. For example, LBS 102 may receive update record 104 from mobile device 106. Table thread 112A may then receive or retrieve update record 104 from table queue 108A.

At stage 420, a columnar-store database is updated with the update record. For example, table thread 112A may update the column fragment with the ID corresponding to update record 104 with the information of update record 104.

At stage 430, a spatial grid of a spatial-temporal index within a memory corresponding to a location component of the update record is identified. For example, index thread 112B may receive or retrieve update record 104 from index queue 108B. Index thread 112B may then identify a spatial grid unit 120A corresponding to a location component of update record 104.

At stage 440, a temporal index of the spatial grid is updated based on the temporal component of the update record. For example, index thread 112B may update the temporal index 122 of the identified spatial grid unit 120A.

Example Computer System

Figure 5:
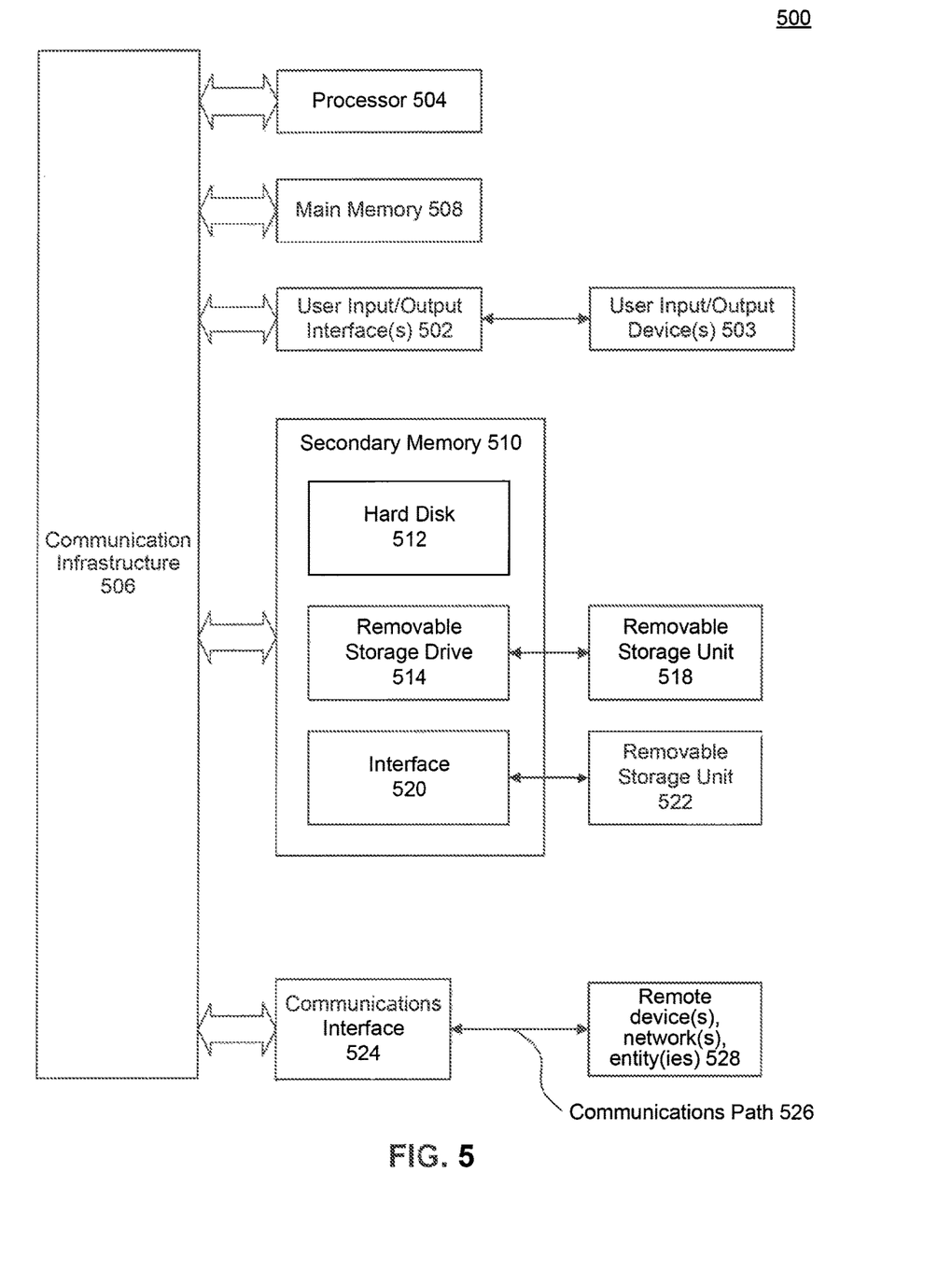
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system comprising:
    a memory structure configured to store location-based data received from a plurality of mobile devices located across a geographic area for a first period of time below a threshold;
    a disk structure configured to store location-based data associated with the plurality of mobile devices located across the geographic area for a second period of time beyond the threshold, wherein the first period of time is contiguous with the second period of time;
    a spatial temporal index corresponding to the location-based data stored across at least a portion of both the memory structure and the disk structure, wherein the spatial temporal index comprises a spatial grid comprising a plurality of grid units that represent different portions of the geographic area and a temporal index corresponding to the spatial grid, wherein the temporal index comprises a plurality of time periods, and wherein the spatial temporal index indicates where the plurality of mobile devices were located across the geographic area based on the spatial grid during the plurality of time periods of the temporal index;
    one or more processors including a plurality of thread pools, including a table thread pool associated with the disk structure and the memory structure, and an index thread pool associated with the spatial temporal index, each thread pool configured to independently and in parallel update the location-based data or process queries associated with the location-based data;
    the table thread pool including a plurality of table threads configured to:
        retrieve an update record from a first queue, the update record comprising a location component and a temporal component indicating a location of a particular mobile device in the geographic area at a specified time, and
        update the memory structure or the disk structure based on at least whether the specified time is below or beyond the threshold; and the index thread pool including a plurality of index threads configured to:
        identify a particular one of the grid units within the spatial temporal index corresponding the location component of the update record, and
        update the temporal index of the identified grid unit based on the temporal component of the update record, wherein at least one of the plurality of table threads updates either the memory structure or the disk structure concurrently with at least one of the index threads updating the temporal index.

2. The system of claim 1, further comprising a query thread pool including a plurality of query threads configured to:
retrieve a query relating to the location-based data from a query queue,
identify a spatial grid associated with the query,
determine whether a temporal index associated with the query resides in the memory or on the disk, process the query with regard to the determined temporal index of the identified spatial grid associated with the query, and provide a result of the query.

3. The system of claim 1, comprising a prediction hashmap including predicted location data for at least a subset of the plurality of mobile devices based on a velocity, direction, and location information received from the subset of mobile devices.

4. The system of claim 3, wherein the columns of the column-store database are divided into a plurality of column fragments allowing the table threads to independently and simultaneously access each column fragment.

5. The system of claim 3, wherein the update data, when retrieved from one of the queues, is stored in the column-store database without prior storage in a buffer.

6. The system of claim 3, wherein the one or more processors includes a query thread pool that receives a predictive query, and wherein the query thread responds to the predicative query based on the predication hashmap.

7. The system of claim 3, wherein the predication hashmap corresponds to a prediction as to the location at a configurable time interval.

8. The system of claim 1, wherein the memory structure comprises a column-store database.

9. The system of claim 1, wherein the temporal index includes location-based data stored in a compressed bitmap.

10. The system of claim 9, wherein the compressed bitmap is based on combining one or more bitmaps of varying granularity.

11. The system of claim 1, wherein the threshold includes a plurality of thresholds of varying time intervals.

12. The system of claim 1, wherein the location of the plurality of mobile devices as indicated by the location component and the temporal component is spread across the geographic area, wherein if a respective one of the spatial grid units does not meet a specified criteria, the respective spatial grid unit is sub-divided into a plurality of smaller spatial grid units.

13. The system of claim 1, wherein the temporal index tracks which of the mobile objects entered a particular unit of the spatial grid at a particular time.

14. A method comprising:
performing by a thread of a thread pool:
retrieving an update record from a first queue, the update record comprising a location component and a temporal component indicating a location of one of a plurality of mobile devices at a specified time, and
updating either a memory structure or a disk structure with the update record based on at least whether the specified time is below or beyond a threshold, wherein the memory structure configured to store location-based data received from a plurality of mobile devices located across a geographic area for a first period of time below the threshold, and wherein the disk structure is configured to store location-based data associated with the plurality of mobile devices located across the geographic area for a second period of time beyond the threshold, wherein the first period of time is contiguous with the second period of time;
performing, independently and in parallel with the first thread, by a second thread of the thread pool:
identifying a spatial grid of a spatial temporal index within a memory corresponding the location component of the update record, wherein the spatial temporal index corresponds to location-based data stored across at least a portion of both the memory and a disk structure, the spatial grid of the spatial temporal index comprising a plurality of grid units that represent different portions of a geographic area, and a temporal index corresponding to the spatial grid, wherein the temporal index comprises a plurality of time periods, and wherein the spatial temporal index indicates stores where the plurality of mobile devices were located across the geographic area based on the spatial grid during the plurality of time periods of the temporal index, and
updating the temporal index of the spatial grid based on the temporal component of the update record, wherein at least one of the plurality of table threads updates either the memory structure or the disk structure concurrently with at least one of the index threads updating the temporal index.

15. The method of claim 14, further comprising, performing by a third thread:
retrieving a query relating to the location from a query queue;
identifying a particular spatial grid of the spatial temporal index associated with the query;
determining whether a temporal index associated with the particular spatial grid corresponding to the query resides in the memory or on the disk;
processing the query with regard to the determined temporal index of the particular spatial grid associated with the query; and
providing a result of the query.

16. The method of claim 14, wherein the first, second, and third threads perform the respective steps independently and in parallel, and wherein the first thread updates a column-store database, wherein the columns of the column-store database are divided into a plurality of column fragments allowing the plurality of the first threads to independently and simultaneously access each column fragment.

17. The method of claim 14, wherein the third thread processes historical, present, and predictive queries with regard to the location-based data, wherein the predictive query is associated with a predicted location of a particular one of the plurality of mobile devices.

18. The method of claim 14, wherein the temporal index includes location-based data stored in a compressed bitmap.

19. A tangible computer-readable device having instructions stored thereon that, when executed by at least one computing device, causes the at least one computing device to perform operations comprising:
performing by a first thread of a thread pool:
retrieving an update record from a first queue, the update record comprising a location component and a temporal component indicating a location of one of a plurality of mobile devices at a specified time, and
updating either a memory structure or a disk structure with the update record based on at least whether the specified time is below or beyond a threshold, wherein the memory structure configured to store location-based data received from a plurality of mobile devices located across a geographic area for a first period of time below the threshold, and wherein the disk structure is configured to store location-based data associated with the plurality of mobile devices located across the geographic area for a second period of time beyond the threshold, wherein the first period of time is contiguous with the second period of time;

performing, independently and in parallel with the first thread, by a second thread of the thread pool:
  identifying a spatial grid of a spatial temporal index within a memory corresponding the location component of the update record, wherein the spatial temporal index corresponds to location-based data stored across at least a portion of both the memory and a disk structure, the spatial grid of the spatial temporal index comprising a plurality of grid units that represent different portions of a geographic area, and a temporal index corresponding to the spatial grid, wherein the temporal index comprises a plurality of time periods, and wherein the spatial temporal index indicates stores where the plurality of mobile devices were located across the geographic area based on the spatial grid during the plurality of time periods of the temporal index, and
  updating the temporal index of the spatial grid based on the temporal component of the update record, wherein at least one of the plurality of table threads updates either the memory structure or the disk structure concurrently with at least one of the index threads updating the temporal index.

20. The computer-readable device of claim 19, the operations further comprising, performing by a third thread:
  retrieving a query relating to the location from a query queue;
  identifying a particular spatial grid of the spatial temporal index associated with the query;
  determining whether a temporal index associated with the particular spatial grid corresponding to the query resides in the memory or on the disk;
  processing the query with regard to the determined temporal index of the particular spatial grid associated with the query; and
  providing a result of the query.

* * * * *